Figure 1:
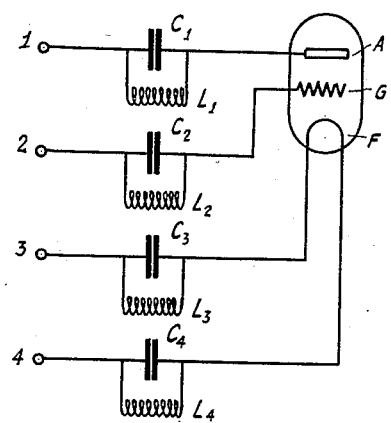

Nov. 3, 1931.  E. GREEN  1,830,164
CIRCUIT ARRANGEMENT FOR HIGH FREQUENCY CURRENTS
Filed Jan. 22, 1927    2 Sheets-Sheet 1

INVENTOR
ERNEST GREEN
BY
*Ira J. Adams*
ATTORNEY

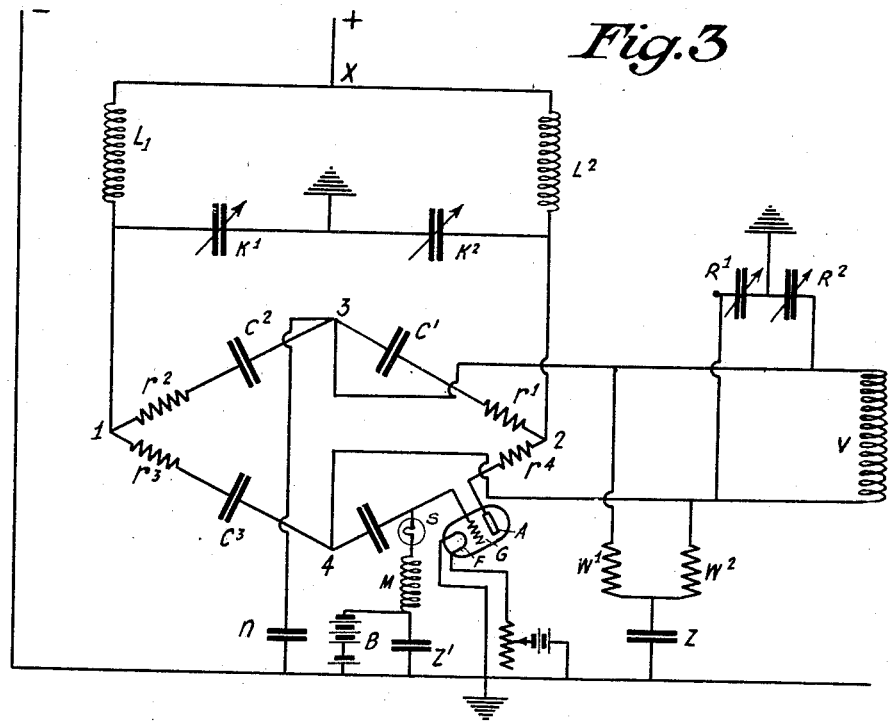
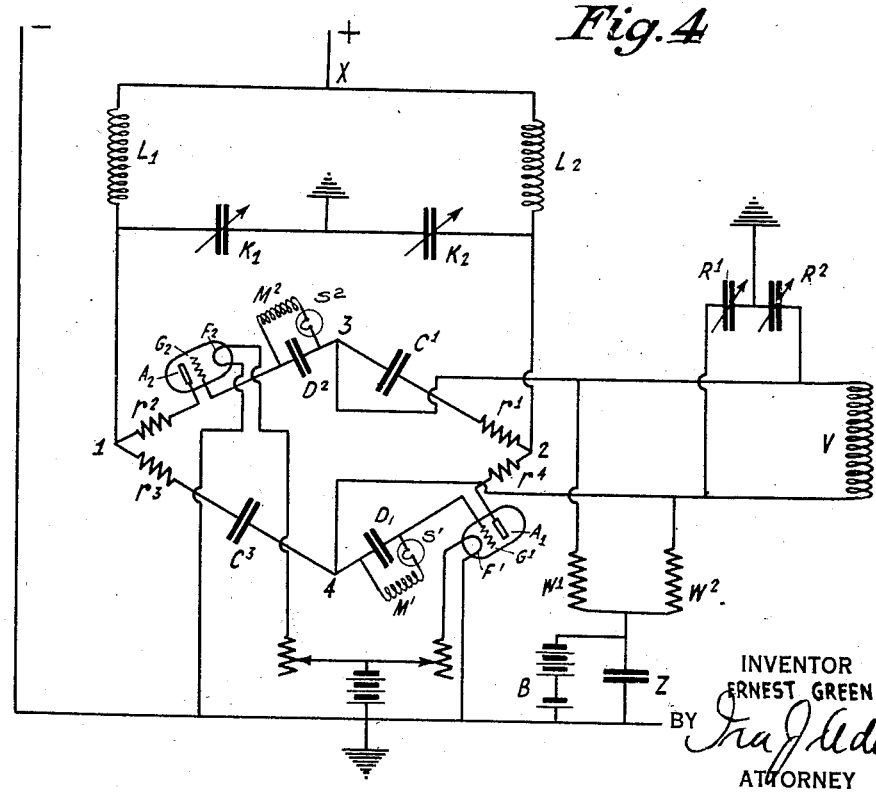

Patented Nov. 3, 1931

1,830,164

UNITED STATES PATENT OFFICE

ERNEST GREEN, OF HENDON, ENGLAND, ASSIGNOR TO RADIO CORPORATION OF AMERICA, A CORPORATION OF DELAWARE

CIRCUIT ARRANGEMENT FOR HIGH FREQUENCY CURRENTS

Application filed January 22, 1927, Serial No. 162,723, and in Great Britain February 11, 1926.

This invention relates to circuit arrangements for high frequency currents, more particularly for high frequency currents used in wireless telegraphy and telephony.

In wireless telegraphy and telephony it is frequently necessary to so arrange a circuit that there shall be substantially no alternating current potential difference between two points of that circuit. This requirement frequently arises in the case of thermionic valves, when it is often necessary that the grid or other electrode of a valve shall be at exactly, or very nearly exactly, the same alternating current potential as some other point in their circuit.

It will be appreciated that when dealing with the very high frequencies met with in wireless telegraphy and telephony this requirement is very difficult to carry into effect.

One frequent cause of difficulty arises from the reactance of the lead or leads connecting the two points whose alternating current potential is required to be the same. It will be appreciated that the presence of, say, inductance, in such a lead or leads gives rise to a reactance voltage drop along the said lead or leads.

According to this invention, in order to permit an electrode of a thermionic valve to have imparted to it the same or nearly the same alternating current potential as some other point in the circuit, I provide in the connection to the said electrode a vectorially negative reactance such that it compensates for the vectorially positive reactance due to the self-inductance of the connecting wire or lead.

In one form of construction a vectorially negative reactance comprises a condenser inserted in the lead to the electrode of a thermionic valve, and preferably of such magnitude that at the frequency at which the said lead will be supplied, the reactance due to the said condenser is quantitatively substantially equal to and vectorially of opposite sense to the reactance due to the self-inductance of the said lead at that frequency.

In cases where it is desired, in addition, to supply a direct current along the lead, means such as a coil, which may or may not directly shunt the condenser, may be provided. Preferably this coil is of such inductance that the alternating current through it is small.

An example of an application to which this invention is particularly advantageous will now be described:—

In the copending application of Franklin and Green, Serial No. 43,924, filed July 16, 1925, there is described a Wheatstone bridge arrangement, which is employed to decouple the grid and anode circuits of a thermionic valve, in order to prevent reaction at high frequencies. In this bridge arrangement it is very necessary that an extremely accurate balance be obtained, and an examination of the said bridge arrangement will show that an accurate balance is not possible if certain of the leads, more particularly the lead to the grid of the valve, have an appreciable inductance.

It should be noted that the term "balance" as used in the present connection implies more than the purely electrical balance of a Wheatstone bridge. It requires that when the circuit is in operation, the alternating potential on the grid of a valve shall be wholly provided by the driving circuit, and that this shall be the only direct effect of the power in the driving circuit.

When the present invention is applied to the bridge arrangement shown in the above mentioned application, I include in the grid lead to the valve (or in the grid leads to the valves, if two valves be employed, one in each of the opposite arms of the bridge) a condenser of such value that its reactance at the working frequency is quantitatively equal (or nearly equal) and vectorially opposite to the inductive reactance of the said grid lead at that frequency. In order to permit the passage of direct current to the grid, the condenser is shunted by means, such as a coil. The inductance of the coil should be such that the passage of alternating current therethrough is small. The coil or other means to allow the passage of direct current into the valve need not directly shunt the condenser, but may be connected in any other desired manner.

It can be further shown that perfect "balance" will not be obtained unless the reactance of the connecting leads to anode and filament are neutralized because the pulsating feed to the valve (or valves) flows through these leads, which also form part of the driving circuit. The reactances of these leads may be neutralized by the insertion of negative reactance devices such as that already described in connection with the grid lead, but as the reactance of the anode lead acts in the opposite sense to that of the filament leads, it may be more simple to suitably proportion their reactances to balance one another instead of inserting negative reactance devices.

It will be seen that if the vectorially negative reactance connected in the lead to an electrode of a valve is dimensioned so as to neutralize the self-inductance of the said lead, the setting up of an alternating current potential difference along the said lead due to its self-inductance, will be substantially prevented; or, if desired, a controlled and desired degree of reaction or like effect may be obtained by dimensioning the said negative reactances to be either larger or smaller than that necessary for exact compensation.

The invention is illustrated in the accompanying diagrammatic drawings which show various applications of the invention.

Figure 1 illustrates an arrangement in which the invention is applied to neutralize reactance of the leads to a thermionic valve. In Figure 1, A, F and G, are the anode, filament, and grid, respectively, of the thermionic valve, 1 and 2 are the leads to the anode and grid, respectively, and 3, 4, are the leads to the filament. Inserted in each lead are condensers $C_1$, $C_2$, $C_3$, $C_4$, each having a negative reactance substantially equal, and vectorially opposite to the reactance of the lead in which it is inserted. $L_1$, $L_2$, $L_3$, $L_4$, are by-pass chokes preferably of high impedance and serving to permit the passage of direct currents to the valve electrodes. Reactances may be inserted in series with these chokes to prevent oscillations arising due to the presence of $C_1$ $L_1$, etc. In some cases $L_1$, $L_2$, $L_3$, $L_4$, may be of small impedance and may carry an appreciable fraction of the total high frequency current. In such cases $C_1$ $L_1$, $C_2$ $L_2$, $C_3$ $L_3$, $C_4$ $L_4$, should be so dimensioned that the combined parallel reactance of each pair is negative in respect to and quantitatively equal to the positive reactance of the appropriate lead.

Figure 2:
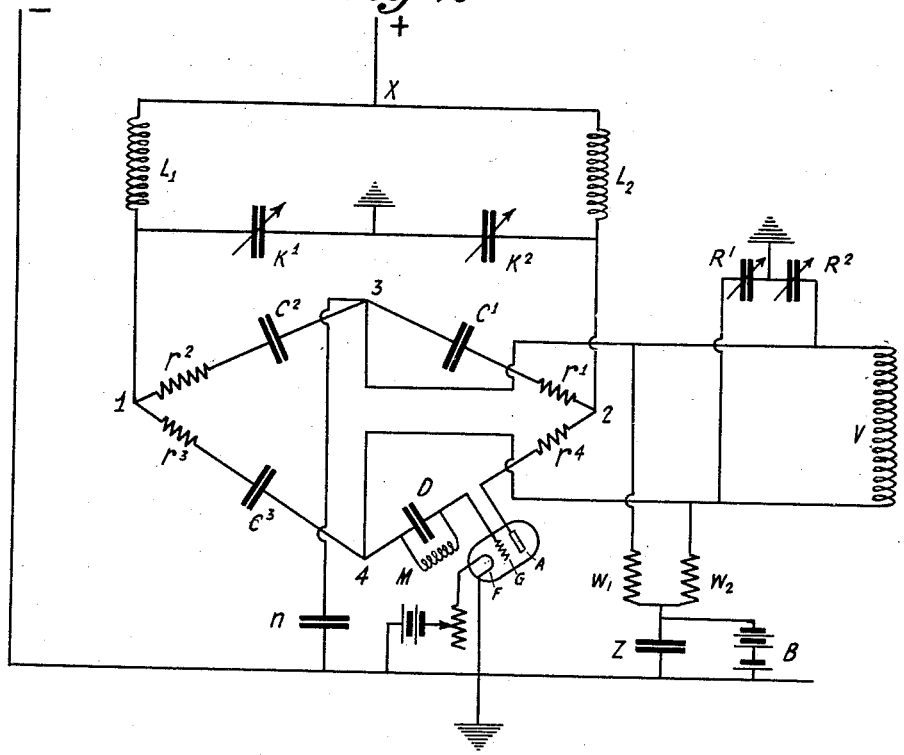

Figure 2 illustrates the application of the invention to the anti-reaction arrangement of the Wheatstone bridge type described in the above mentioned copending application. Referring to Fig. 2 of the drawings A, G and F are the anode grid and filament electrodes of the power valve. The condenser formed by the capacity between A and G is arranged to form one arm of a Wheatstone bridge, the other arms of which are formed as shown by condenser C1, C2 and C3. To insure that the resistance of the arms will be equal, small adjustable resistances R1, R2, R3 and R4 are placed in the respective arms of the bridge. A small condenser N is also connected from the common point 3 and C1 and C2 to earth. The capacity of N should be equal to the capacity between the grid G and filament F of the valve. Points 1 and 2 constituting a pair of conjugated neutral points of the bridge and points 3 and 4 constitute an opposite pair of neutral points. It will be apparent that, due to the balance bridge arrangement, when a difference of potential is impressed across points 3 and 4 across which the grid or drive circuit of the valve is connected, no difference of potential occurs between points 1 and 2. The primary circuit which is connected across points 1 and 2 comprises inductances L1 and L2 and adjustable condensers K1 and K2, separate from and in parallel with the condensers forming the bridge. The positive high tension power supply is connected at the point between the inductance L1 and L2.

The grid or drive circuit which is connected across points 3 and 4 comprises the inductance V and adjustable condensers R1 and R2 in parallel with the condensers forming the bridge. Across the grid circuit are two resistances W1 and W2 in series with their common point connected through a blocking condenser Z to earth and across which is provided a grid biasing battery B.

The inductance V is coupled to the output circuit of a drive oscillator not shown. Any oscillations induced in the grid circuit produces potential variations across points 3 and 4 of the bridge. Currents flow through the bridge in two parallel paths, one through the condenser formed between G and A and the condenser C1 in series, the other through the condensers C2 and C3 in series. If the variation of potential of the points 3 and 4 is symmetric with respect to earth, and each of the condensers and resistances of the bridge arms are equal, no variation of potential of the points 1 and 2 will occur with respect to each other or to earth and consequently no current can be induced in the primary circuit L1 and L2. It will be noticed that the whole of that part of the primary circuit comprising the inductance L1 and L2 and variable condensers K1 and K2 remains at earth potential, forming no part of the grid circuit and any adjustments made in the primary circuit will not effect the balance or the tune of the grid circuit.

Up to this point the device shown in Fig. 2 of the present invention is similar to the device shown in the specification referred to. However, where a greater degree of balance is necessary the arrangement shown in Figure 2 which differs from that disclosed in the said patent specification only by the insertion of a condenser D and shunting choke M in the lead from the lowermost point 4 of the bridge to the grid G of the thermionic valve, is used. The condenser D constitutes a negative reactance balancing the reactance of the said lead and the shunting choke M permits the passage of grid current.

It will be seen that if the negative reactance device were not provided, then, despite the general balance and symmetry of the bridge arrangement, the fraction of the primary current passing through the reactance of the lead from the point 4 to the grid G would give rise to an alternating potential on the grid G, and thereby possibly cause the whole arrangement to become unstable at very high frequencies, say, over $10^7$ cycles per second.

In a modification a resistance such as a lamp is inserted in series with the choke M across the condenser D, the said resistance serving to prevent undesired oscillations which might otherwise be set up due to the choke M, and condenser D. For instance, a resistance in the form of lamp S as shown in Figs. 3 and 4 may in certain cases be placed in series with the inductance M of Fig. 2.

Figure 3 shows a further modification differing only from the last described modification in the location of the choke M, which in this case is placed in series with the grid bias battery B and resistance S between the grid and filament of the tube. In this figure S is a resistance, which for purposes of illustration is shown as a lamp, Z′ is a condenser shunting B the grid-bias battery.

Figure 4 illustrates the application of the invention to a modification of the Wheatstone bridge anti-reaction arrangement hereinbefore described and differing therefrom only in that two thermionic valves are employed one in each of a pair of opposite arms of the bridge. Negative reactance devices D1, D2, chokes M1, M2, and resistances S1, S2, are inserted in the leads 4—G1 and 3—G2 in like manner as in the arrangements described in connection with and illustrated in Figures 2 and 3.

Having now particularly described and ascertained the nature of my invention, I claim:

1. In a circuit arrangement for high frequency currents including a thermionic valve, a vectorially negative reactance provided in the leads to the electrodes of said valve, such that it compensates for the vectorially positive reactance due to the self-inductance of said leads, an inductive means associated with said negative reactance to permit direct current to be applied to the electrodes of said valve.

2. In a circuit arrangement for high frequency currents including a thermionic valve, a vectorially negative reactance comprising a condenser provided in each of the leads to the electrodes of said valve, the value of each condenser being such that it compensates for the vectorially positive reactance due to the self-inductance of its lead, and an inductance shunting said condenser.

3. In a circuit arrangement for high frequency currents including a thermionic valve, a vectorially negative reactance comprising a condenser provided in the leads to the electrodes of said valve, such that it compensates for the vectorially positive reactance due to the self-inductance of said leads, and a high impedance shunting said condenser to permit direct current to be supplied to the electrodes.

4. In a circuit arrangement for high frequency currents including a thermionic valve, a vectorially negative reactance comprising a condenser provided in the leads to the electrodes of said valve, such that it compensates for the vectorially positive reactance due to the self-inductance of said leads, and a high impedance and resistance in series shunting said condenser.

5. In a circuit arrangement for amplifying high frequency oscillations, a Wheatstone bridge circuit having the grid and plate of a vacuum tube in one arm of the bridge circuit, a vectorially negative reactance provided in the leads to the electrodes of said valve, such that it compensates for the vectorially positive reactance due to the self-inductance of said leads, each of the other arms of said bridge circuit having a condenser equal to each other and to the inherent capacity between grid and plate for obtaining a true balance of said bridge circuit.

6. In a circuit arrangement for amplifying high frequency oscillations, a Wheatstone bridge circuit having the grid and plate of a vacuum tube in one arm of the bridge circuit, a vectorially negative reactance provided in the leads to the electrodes of said valve, such that it compensates for the vectorially positive reactance due to the self-inductance of said leads, each of the other arms of said bridge circuit having a condenser equal to each other and to the inherent capacity between grid and plate for obtaining a true balance of said bridge circuit, an input circuit connected to the grid and to the opposite corner forming one diagonal of the bridge circuit, and an output circuit connected to the plate and to the opposite corner forming the other diagonal of the bridge circuit.

7. In a circuit arrangement for high frequency currents including a thermionic valve, means to insure stable operation of said valve including means associated therewith for neutralizing the inherent reactance in at least one of the leads to the electrodes of said valve due to the self-inductance of said lead, and inductive means to permit direct current to be applied through said lead to said electrode.

8. In a circuit arrangement for high frequency currents including a thermionic valve, means to insure stable operation of said valve including means associated therewith for neutralizing the inherent reactance in at least one of the leads to the electrodes of said valve due to the self-inductance thereof, means to permit direct current to be applied to said electrodes, and means for preventing undesired oscillations from being set up in the first and second named means.

9. In a circuit arrangement for high frequency currents including a thermionic valve, a vectorially negative reactance provided in each of the leads to the electrodes of said valve, such that it compensates for the vectorially positive reactance due to the self-inductance of said lead, and an inductance and resistance associated with said reactance to permit direct current to be applied to the electrodes of said valve, and to prevent local oscillations therein.

10. In high frequency radio apparatus having a thermionic valve and leads for the electrodes thereof which leads each inherently possesses a vectorially positive reactance due to the inductance of the lead, means having a vectorially negative reactance equal to the positive reactance of the lead associated with each lead, means associated with each lead whereby a direct current potential may be applied through the lead to the electrodes of said valve, and a resistance in series with said last named means for damping out oscillations in said first and second named means.

11. In a circuit arrangement for high frequency currents including a thermionic valve and leads to the electrodes thereof, means including a condenser associated with each of said leads for compensating the inherent positive reactance thereof, an inductance associated with said last named means for allowing direct current to be applied to the electrodes of said valve through said leads, and a resistance in series with said inductance.

ERNEST GREEN.